United States Patent [19]
Gilker

[11] 3,754,630
[45] Aug. 28, 1973

[54] SHOPPING CART RECEIVING MEANS

[76] Inventor: Donald J. Gilker, 3301 N. Lowry Rd., Los Angeles, Calif. 90027

[22] Filed: Mar. 13, 1972

[21] Appl. No.: 234,236

[52] U.S. Cl. .................................................... 194/4
[51] Int. Cl. ............................................. G07f 1/06
[58] Field of Search ................... 194/4, 10, DIG. 23

[56] References Cited
UNITED STATES PATENTS
2,818,955  1/1958  Stackhouse ........................ 194/4 F
3,283,868  11/1966  Kuhns et al. ....................... 194/4 R

*Primary Examiner*—Stanley H. Tollberg
*Attorney*—Georges A. Maxwell

[57] ABSTRACT

A unitary shopping cart receiver to be arranged in pre-determined proximity to a store or the like providing a plurality of carts for shoppers and adapted to induce shoppers to deposit shopping carts in the receiver when their use thereof is terminated. The receiver involves an elongate chute with parallel sides, open front and rear ends and into which shopping carts can be manually engaged for longitudinal movement and storage therein. The receiver has a gate means at its rear end to releasably return carts deposited therein. The receiver next has a dispenser operable to dispense a prize or reward each time a cart is advanced into engagement in the receiver at the front end thereof. Finally, the receiver has receiving means at its front end to permit the advance of a cart into engagement in and to prevent the withdrawal of a cart or carts from the front end of the receiver and related to the dispenser to operate the dispenser each time a cart is advanced into engagement in the receiver.

9 Claims, 13 Drawing Figures

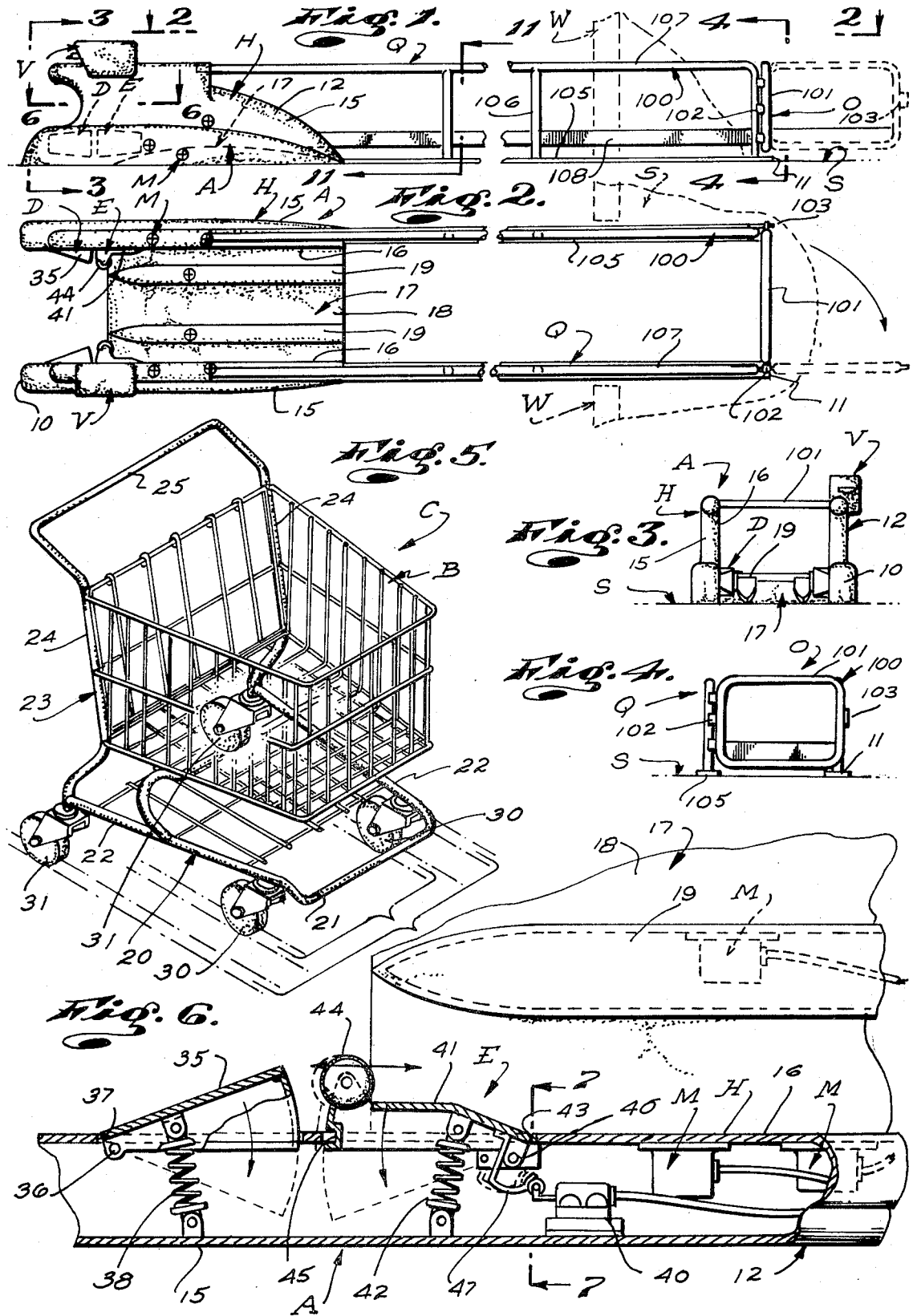

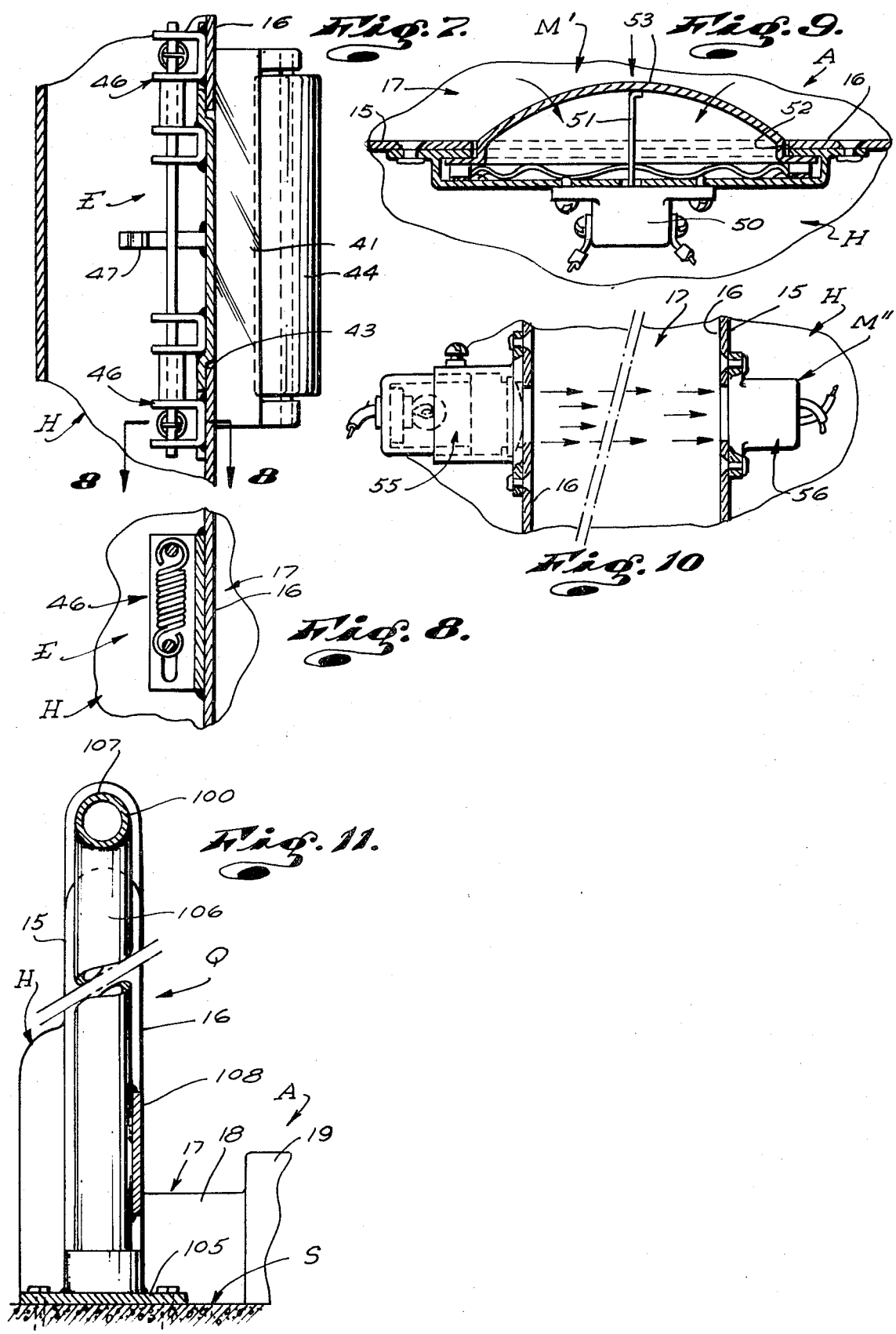

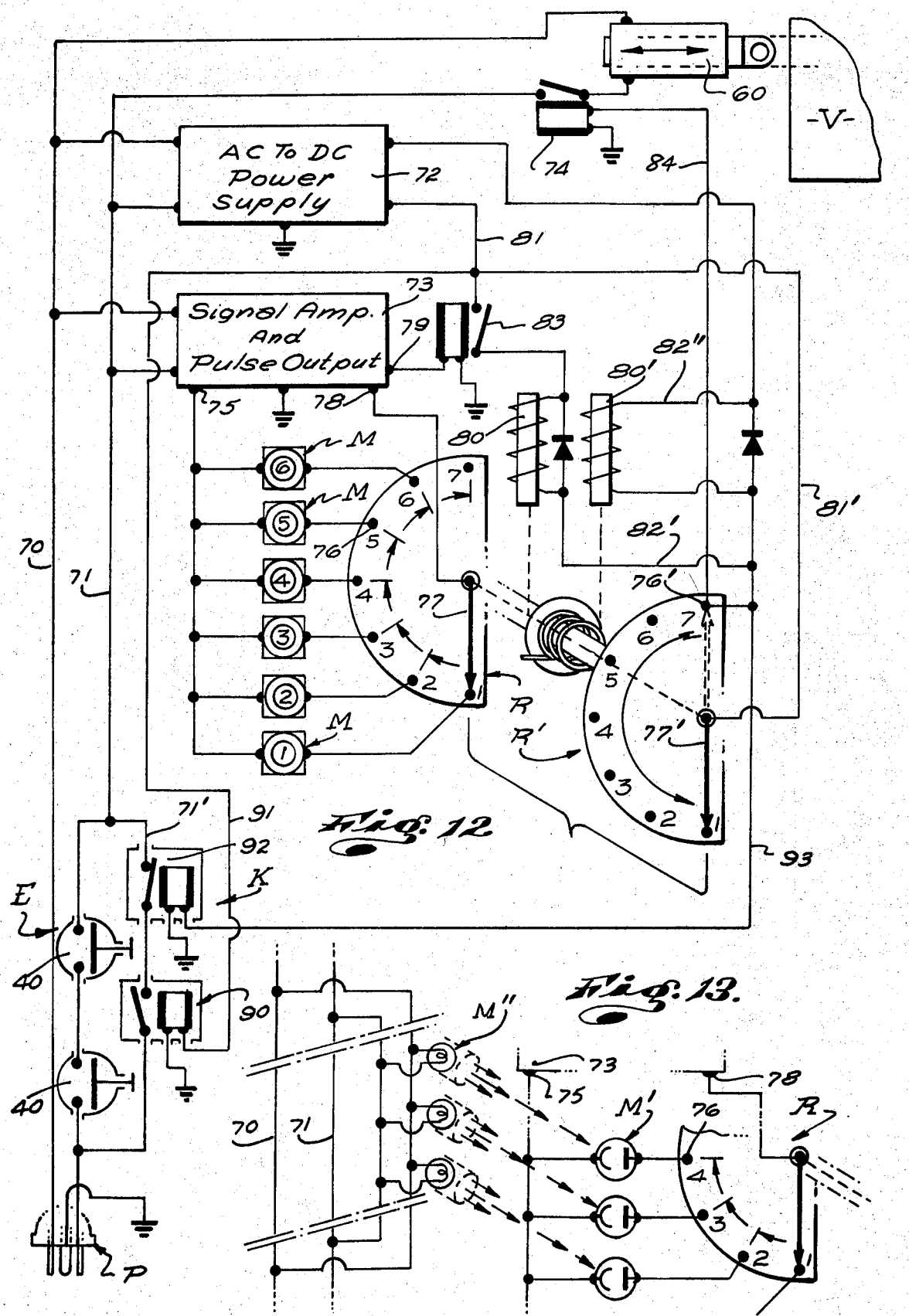

SHOPPING CART RECEIVING MEANS

This invention has to do with a novel means for effecting proper and beneficial handling of shopping carts.

It is common practice in the art of merchandising for merchants to provide parking lots in which their patrons can conveniently park their automobiles and to provide wheeled, wire-basket type push carts, commonly referred to as shopping carts, in which their customers can deposit their purchases while in the store and in which the purchase can be transported, from the store, into the parking lot and to the customers' automobiles, for final transfer into their automobiles.

There is an ever increasing number of shopping centers and large stores where parking lots cover many acres of land and where hundreds of shopping carts are provided for customer use. In such situations where customers move carts from the store in which they have shopped to their automobiles, in the parking lot and after they have transferred their purchased goods into their automobiles, they generally simply leave the cart abandoned in the parking lot and drive away in their automobiles.

Shopping carts abandoned and left unattended in parking lots in the above manner are a nuisance as they require the merchants to hire personnel to move about the parking lots, collect the carts and return them to the store for further use; they create serious traffic hazards in the parking lots and are frequently damaged by customers' automobiles and in turn do damage to the automobiles. Further, such abandoned carts are subject to being stolen and pirated of their wheels and the like, and their remainder sold as scrap.

It has been clearly established that in those certain places where customers have been encouraged to return carts to stores from adjacent parking facilities and in those places where special facilities have been provided in parking areas to accomodate emptied carts, damage, theft and all other inconveniences normally associated with the provision and use of such carts has been materially and noticeably reduced.

It has been determined that if customers could be encouraged to deposit their empty carts in specially provided receivers located in parking lots and/or at the stores which provide the carts, great economic savings and more effective and efficient use of carts could be achieved.

An object and feature of my invention is to provide a novel means for receiving and holding shopping carts, which means includes a dispensing device which is operated to dispense a suitable reward each time a cart is deposited therein.

In practice, the reward dispensed by my invention can be a coupon or chip which is redeemable in the merchant's store for something of value or can be a gift item, such as a piece of gum, candy or the like.

It is contemplated that if the reward to be received is not desired by certain persons and they are disposed to simply abandon their carts in parking areas, it can and will be such that others, such as children, desirous of receiving the reward, will diligently search for abandoned carts and deposit them in the means that I provide and receive their reward.

Since the act of depositing carts in the means that I provide is in fact being paid for by the reward given by the merchants, and so that a person cannot cheat and obtain rewards improperly as by moving one or more carts into and out of engagement in and with the cart receiving means, it is an object and a feature of my invention to provide a cart receiving means which is such that unauthorized removal of carts therefrom for reengagement or reentry into the means for the purpose of cheating and collecting unearned rewards is made impossible or so difficult as to be impractical.

It is an object and feature of my invention to provide a means of the character referred to having novel actuating or control means for the dispenser device which actuating or control means is such that it is only responsive to and can, under ordinary circumstances, only be operated by the engagement and movement of a shopping cart therewith and therethrough.

Shopping carts have become standarized to a great extent. The primary differences which exist between the several different makes and models of shopping carts, as they might affect the present invention, is the overall size of the carts. There are only two and possibly three different sizes of carts being regularly produced at this time.

The carts are such that all carts of any one particular size can be interengaged one within another so as to conserve storage space and to facilitate the handling and moving about of a number of carts together.

As a result of the above, it is common and generally accepted practice for a merchant to acquire carts of one size and generally of one brand or make so that uniformity and desired compatibility of the carts can be maintained.

In large shopping areas where a number of merchants provide shopping carts, it has become common practice for the merchants to cooperate and to acquire similar carts so that uniformity and compatibility of all carts in the area is assured.

As a result of the above, it is necessary that my invention be provided in two or possibly three different sizes to receive different size carts. With few present exceptions and with less likelihood of future exceptions, it is only necessary that one size of my new cart receiving means need be provided in each shopping area or at each store.

It is a general object and feature of my invention to provide actuating and/or control means for the dispensing device which operate in the nature of a combination lock in that said means is responsive to and is operated by the movement or predetermined parts and or portions of a standard shopping cart, as the cart is moved lineally along a predetermined path or course.

It is an object of this invention to provide actuating and/or control means of the general character referred to above which utilizes micro switches, metal proximity detector means, light generating and photo detecting means, mechanical latch and/or lever means, or a combination of two or more of such means, to detect and/or sense the movement of a cart into engagement in and with my new cart receiving means.

It is an object of my invention to provide a simple, inexpensive, durable and dependable means of the general character referred to above which can be economically provided in any necessary or required number and which can be arranged and located in any necessary or desired manner to make its use most convenient and effective.

The foregoing and other objects and features of my invention will be fully understood and will become apparent from the following detailed description of typical preferred forms and embodiments of the invention, throughout which description reference is made to the accompanying drawings, in which:

FIG. 1 is a side elevational view of my invention;

FIG. 2 is a plane view taken as indicated by line 2—2 on FIG. 1;

FIG. 3 is a front end view taken as indicated by line 3—3 on FIG. 1;

FIG. 4 is a rear end view taken as indicated by line 4—4 on FIG. 1;

FIG. 5 is an isometric view of a typical shopping cart;

FIG. 6 is an enlarged view of a portion of my invention, taken as indicated by line 6—6 on FIG. 1;

FIG. 7 is a view taken as indicated by line 7—7 on FIG. 6;

FIG. 8 is a sectional view taken as indicated by line 8—8 on FIG. 7;

FIG. 9 is an enlarged sectional view of a portion of another form of my invention;

FIG. 10 is an enlarged sectional view of a portion of yet another form of my invention;

FIG. 11 is an enlarged sectional view taken as indicated by line 11—11 on FIG. 1;

FIG. 12 is a circuit diagram;

FIG. 13 is a circuit diagram of a different form of my invention.

The shopping cart receiver provided by the present invention is an elongate, horizontal structure engageable on the ground; a parking lot surface S or other substantial flat, horizontal supporting surface.

The receiver is a chute-like structure with front and rear ends 10 and 11, and laterally spaced vertical sides 12. The receiver is characterized by an acceptor or receiving means A at its forward end and outlet gate O at its rear end.

In practice, and as shown in FIGS. 1 and 2, in phantom lines the receiver can be engaged through an opening in a wall structure W of a store or the like and such that shopping carts at the exterior of the store and deposited in the receiver, are discharged therefrom in the interior of the store.

The receiving means A at the forward end of the chute-like receiver is shown as including an elongate U-shaped housing structure H with laterally spaced, vertical, longitudinally extending side walls 15 with substantially flat, vertical, opposing guide surfaces 16, and bottom 17 extending transverse of and between the side walls 15. The bottom 17 has a top surface 18 with laterally spaced, longitudinally extending, upwardly projecting guide rails 19.

The side walls 15 of the housing H and the bottom 17 or hollow shell-like parts and/or portions defining chamber-like interiors in which certain other elements and/or parts of the means A, which will hereafter be described, are arranged and housed. In practice, the housing can be established of metal, plastic or a combination of such materials, as desired or as circumstances require.

The lateral extent of the bottom 17 and the distance between the opposing guide surfaces 16 of the side walls 15 are slightly greater than the maximum or major lateral extent of a standard shopping cart C, and the vertical extent of the side walls 15 is preferably about the same as the vertical extent of the shopping cart. In practice, the side walls 15 can be made lower or higher than the cart without departing from the spirit of my invention.

The ordinary or standard shopping cart C, as shown in FIG. 5 of the drawings is characterized by a frame F of metal tubing, with an elongate, horizontal lower portion 20 with a transverse or lateral extending front beam 21 and laterally spaced forwardly converging side beams 22. The frame F next includes a substantially vertical rear portion 23 with vertically extending columns 24 with rearwardly turned upper ends and a transversely extending handle bar 25 joined integrally with and extending between the said upper ends. The columns 24 of the rear portion 23 of the frame project upwardly from the rear ends of the side beams 22 of the lower portion 20 of the frame. The cart C next includes a forwardly converged upwardly opening wire basket B which occurs in spaced relationship above the lower portion of the frame and the rear end of which is fixed to the rear portion of the frame. Finally, the cart is provided with front and rear pairs of laterally spaced support wheels fixed to and projecting below the front and rear end portions of the lower portion of the frame F. The front wheels 30 at the forward narrow end of the cart are normally caster type wheels and will be referred to as the narrow gauge front wheels. The rear wheels 31 at the rear and wide end of the frame F can be caster or non-caster type wheels and will be referred to as the wide gauge, rear wheels.

The gauge or lateral spacing of the front wheels 30 is substantially less than the gauge or lateral spacing of the rear wheels and the lines of travel of the front wheels are spaced laterally inwardly from the lines of travel of the rear wheels, as clearly illustrated by the phantom lines in FIG. 5 of the drawings.

The rear end of each cart is such that it will freely slidably receive the front end of another like cart so that a plurality of such carts can be interengaged one within another, in nested relationship.

The details of construction of the cart or carts C can vary widely without affecting the novelty and/or the spirit of this invention, accordingly, I will not burden this disclosure with further and unnecessary detailed disclosure and description of the shopping cart C.

The guide rails 19 on the bottom 17 of the housing H are slightly less in lateral extent than the distance between the lines of linear travel of the front and rear wheels 30 and 31 of the cart C and are spaced apart from each other and relative to the guide surface 16 of the side walls of the housing so that they will occur between the front and rear wheels at each side of a cart engaged between the side walls 15 and serve to guide the cart, in a straight line longitudinally of the housing H, as it is moved rearwardly therethrough.

In practice, the front ends of the rails 19 are spaced rearward from the front end 10 of the side walls 15 and are forwardly tapered or pointed so that a cart with its front end disposed rearwardly relative to the receiving means A and moved rearwardly into engagement between the side walls 15 is guided by the guide surfaces 16 into substantial alignment with the guide rails 19 and so the guide rails establish guiding relationship between and with the front and rear wheels 30 and 31 at each side of the cart C.

In practice, the bottom 17 of the housing is crowned fore and aft to define an upwardly and rearwardly inclined front portion, up which a cart must be urged by a person depositing a cart into the receiving means and has a rearwardly and downwardly inclined rear portion down which a cart will roll, to deposit itself in the rear portion of the receiver, rearward of the receiving means A. The major vertical and longitudinal extent of the inclined portion of the bottom can be varied as desired or as circumstances require.

In practice, the bottom 17 can be substantially flat, without departing from the broader aspects and spirit of my invention.

The means A can next include centering means D at the forward end of the housing, forward of the bottom 17 and guide rails 19. The means D serves to center and align a cart moved rearwardly into the forward open end of the housing H. The means D includes a pair of elongate normally rearwardly and laterally inwardly inclined, horizontal guide members 35 near the forward end portions of the guide surfaces 16 of the side walls 15. The members 35 are horizontal arm-like parts having forward ends pivotally mounted on their related walls 15, on vertical axes as at 36. The surfaces 16 of the walls 15 can be provided with openings 37 to receive the guide members when they are urged to swing laterally outwardly about their pivotal axes. The means D next includes spring means 38 normally yieldingly urging the rear ends of the guide members 35 laterally inwardly.

The guide members 35 are in a common horizontal plane with the lower portion 20 of the frame F of a shopping cart C and are normally inclined relative to each other so that when a cart C is entered into engagement in the housing H, the side beams 22 thereof slidably engage the guide members and the cart is yieldingly steered and guided into proper alignment with the guide rails 19 by the members 35 as the cart is urged longitudinally rearwardly between the guide members and the side walls 15.

Once a cart is moved by the guide members, the members move back to their normal position and will act as stops to prevent withdrawal of the cart from engagement in the receiving means A.

The means A next includes master control switching means E which means is operable to energizing certain electrical circuitry and components of the means A which will hereafter be described. The switching means E can be related to and operated by the guide members 35 of the guide means D or can, as shown, be provided with or include its own mechanical operating means.

In the form of the invention illustrated, the means E includes a pair of switches 40, connected in series with each other between as suitable power sources P and other related circuitry. The power source can be a low voltage battery power supply within the housing H or can be and is preferable a normal municipal power supply or the like (See FIG. 12 of the drawings).

The switches 40 are related to and operated by a pair of laterally spaced, elongate, horizontal, operating arms 41 pivotally mounted on the side walls 15 of the housing to normally project laterally inwardly and rearwardly relative thereto, at or adjacent to the front end of the guide rails and adapted to be engaged and be pivoted laterally outwardly by a cart C as the cart is initially engaged in and with the means A. The arms 41 are preferably engaged as soon as the cart can be said to be fully engaged and aligned in the means A.

The operating arms are suitably spring loaded as at 42 and are normally urged laterally inwardly. The arms 41 are suitably longitudinally inclined to most effectively assure their proper and desired pivoted movement when engaged and moved by a cart.

The side walls of the housing H are provided with openings 43 to receive the arms when they are displaced from within the space defined by the side walls 15 by a cart.

In practice, the noted operating arms 41 can be provided with vertical cart-engaging rollers 44, which are arranged vertically, so that they are engaged by the lower portion of the frame F of a cart or by the basket B of the cart or by both the frame and the basket.

In one preferred form and carrying out of the invention and as shown in the drawings, the arms 41 include latching means to manually hold the arms in their out position relative to the side walls 15 of the housing H, so the arms project into the space between the side walls and prevent the forward movement or withdrawal of a cart from engagement in the construction. The latching means includes a vertical slot 45 in the forward end of each arm 41 and spring loaded, longitudinally shiftable pivot means 46 for and at the rear ends of the arms whereby the arms are manually yieldingly urged forward in their openings 43 in the walls of the housing and so that the slot 45 are urged into engagement about the forward vertical edge portions of the openings 42, as shown in phantom lines in FIG. 6 of the drawings. The spring loaded, longitudinally shiftable pivot means 46 for the arms 41 can vary widely in details of construction. In FIGS. 6, 7 and 8 of the drawings I have shown one typical form of pivot means 46 which would serve in carrying out this invention.

With the means 46 here provided, it will be apparent that the arms 41 are normally locked in their out position and can only be moved laterally outwardly and in the opening 42 and into the side walls of the housing H after they have been yieldingly urged rearwardly in the openings 42 sufficiently to disengage the slots 45 from engagement with the forward edges of the openings. Such forward shifting of the arms 41 is effected by the rearward shifting of a cart in the receiving means, when the cart engages the rollers 44 on the arms.

In practice, instead of the above noted latching means or in addition to and supplementing said latching means, the laterally inwardly disposed surface of the arms 41, occurring rearward of the rollers 44 are, as shown at 41' in FIGS. 2, 4, and 7 of the drawings, moved and advanced laterally outward from the plane on which the axis of the rollers occur and so that the rearwardly disposed sides of the rollers are exposed in such a manner that they will engage the forwardly disposed, rear, transversely extending end of a cart moved forwardly in the structure and in such a manner as to latch with and stop forward movement of a cart in the structure.

With the means set forth above, it will be apparent that the arms 41, by virtue of the noted latching means provided and/or by virtue of the noted latching engagement of the rollers 44 with the rear end of a cart moved forwardly in the structure, effectively prevents the forward movement and disengagement of a cart and from the means A at the forward end of the structure and thereby makes it practically impossible for a person to improperly remove a cart or carts from the forward end of the structure for the purpose of recycling the carts into engagement in the structure and to thereby improperly receive the rewards dispensed thereby.

In practice, and as illustrated, the arms 41 carry cam arms 47 which engage and actuate the switches 40. The switches 40 are standard units which can be mounted in the housing H in any suitable manner.

The means A next includes two or more sensing devices M arranged in the housing H, rearward of the means E and in predetermined spaced relationship whereby they are acted upon and/or sense the presence or the movement of predetermined parts and/or portions of a cart C in the receiving means A. Each of the devices M is related to suitable switching means or the like in the circuiting of the means A, as will hereafter be described.

In practice, the devices M can be metal detectors, light sensors or simple mechanical switches.

In FIGS. 6 and 12, the devices M are diagrammatically illustrated as metal detectors such as are produced by Farmer Electric Products Company, Inc. of Motick, Mass., and designated by that company as PS3 Proximity Sensors. These sensors will operate to detect the presence of all metals when a surface area of about 2 square inches of metal moves within 1½ inches of the sensors.

When the devices M are metal detectors such as referred to above, they are arranged and spaced to sense the movement of predetermined metal parts and/or portions of a cart C by predetermined laterally and/or longitudinally spaced stations in the housing H and are such that when a cart C reaches the stations in the housing, the devices are acted upon in predetermined sequential order and thereby effect further cycling and operation of the invention.

The metal detector sensors M can be arranged within the housing H and obscured from view. In such a case, the housing H is preferably made of resin-fiber glass or similar plastic materials.

Alternatively, and as shown in FIG. 9 of the drawings, the sensing devices M' can be in the form of simple pressure actuated switches 50 suitably mounted within the housing H' and having actuating levers or fingers 51 projecting through openings 52 in the housing, into the path of carts C through the housing. The openings 52 can be large openings in which pressure plates or pads 53 are yieldingly arranged, to project into the path of the carts C through the housing and which are engaged by the fingers 51, as illustrated.

The devices M can be arranged in the bottom 17 of the housing H' to be engaged by the wheels 30 and/or wheels 31 of the cart C, and can be arranged in the side walls 15 of the housing to be engaged by the vertical columns 24 of the rear portion 23 of cart frames F.

Yet another alternative form of sensing device or means M'' is shown in FIGS. 10 and 13 of the drawings.

In this form of the invention, the devices M'' are photo sensitive devices or means and include light generating units 55 mounted within one side wall of the housing to direct a beam of light to the other side wall of the housing and a photo electric cell unit 56 mounted within the other side wall of the housing and in alignment with and acted upon by the beam of light. With the means M'', it will be apparent that when a cart is moved rearwardly through the housing H, the beams of light between the units 55 and 56 of the several units are broken or interrupted by the cart and in such a manner that the movement and/or passage of the cart is effectively and appropriately, sequentially sensed.

The means A next includes a dispenser V which dispenser can be in the nature of a vending machine operatively related or connected with and under control of the circuiting in and with which the sensing means or devices M are related. The dispenser V can be any suitable dispensing mechanism capable of being actuated directly by electric current or operated indirectly by such current by means of an electrically operated actuator, such as a solinoid 60.

The dispenser V can be such that it will, when actuated or operated, dispense a discount coupon or chip of value; can be such that it dispenses savings stamps or the like or can, if desired, be such that it will dispense candy, gum or some other suitable favor, gift or prize.

In the broader sense and spirit of my invention, the dispensing means V could be such that when actuated, it sets into motion a children's ride, such as a mechanical pony, simulated airplane or the like and as such, could be said to dispense rides.

Since the exact form and nature of the dispensing means that can be employed in carrying out my invention can vary widely in form and construction, I will not burden this disclosure with further detailed consideration and description of such a means and have, for the purpose of this disclosure, shown the dispenser in block diagram form and as being conveniently mounted atop one of the side walls 15 of the housing H at the forward portion thereof.

Referring again to the positioning of the sensing means or devices M, they can be arranged within the guide rails 19 on the bottom 17 of the housing H to sense the passing of the front and/or rear wheels of a cart at predetermined stations; can be placed in the side walls 15 of the housing to sense the passing of the rear wheels and/or the rear of the lower portion 20 of the frame F and can be placed to respond to the proximate positioning of the vertical columns of the rear portion of the frame F, at any desired vertical location, longitudinally of the columns.

In light of the above, it will be apparent that the devices M can be arranged in what can be said to be an infinite number of different combinations of locations or stations within the housing H and along the path of a cart C therethrough. As a result of the above, the arrangement of the devices M can be different in each cart receiver embodying the invention.

Since the number and arrangement of sensors M can be and are subject to wide variation, I have, in FIGS. 1 and 2 of the drawings diagrammatically indicated the possible location of six sensors M, by means of circled x's. Two sensors are shown arranged in each side wall 15 and two are shown in the bottom 17.

Referring to FIG. 12 of the drawings, I have shown a typical preferred electric circuit for the means A which operatively relates the several sensors M with each other and with the means E and the dispenser V or an actuator unit 60 for the dispenser.

The circuit provided includes a power cable with two lines 70 and 71 connected with an AC power service P. The two operating or starting switches 40 of the means E are arranged in series in the line 71. The switches 40 control the supply of operating current to an AC to DC power supply unit 72, to a signal amplifier and pulse output generator unit 73, and to the actuator unit 60, which units connect with the lines 70 and 71 or with legs thereof. The leg of the line 71 connected with the unit 60 has a normally open power relay switch 74 therein.

One terminal or side of the several (6) sensing devices M, numbered 1 through 6, are connected with a signal output terminal 75 of the unit 73 and the other terminal or side of the devices M are connected with spaced contacts 76, numbered 1 through 6, of a 7 contact rotary stepping switch or stepping relay unit R. The wiper contact 77 of the unit R is connected with a signal input terminal 78 of the unit 73.

The unit 73 amplifies the signals of the devices M and operates to deliver an operating pulse or current at an output terminal 79 when a signal of predetermined value or magnitude from a device M is received thereby.

The unit R has an advancing coil 80 with one end connected with a line 81 extending from one power supply terminal of the unit 72 and has its other end connected with the other power supply terminal of the unit 72 by a line 82 and a leg 82' of the line 82.

A normally open relay switch 83 is arranged in the line 81 and is connected with the terminal 79 of the unit 73.

The wiper contact 77 of the unit R is normally in contact with contact 76, number 1. When the circuit is energized as by closing of the switches 40, the circuit to device M, number 1, is closed and when that device is actuated or its signal input and/or output is effectively altered by the proximate movement of a part of a cart C thereby, the unit 73 delivers operating current to the relay switch 83, closing said switch, whereupon the coil 80 operates to advance the wiper 77 to contact 76, number 2. The operating current to the relay switch 83 is turned off and that switch opens and remains open until a next operating signal from device M, number 2, in response to the proximate movement of a cart thereby again cycles the unit 73 to effect closing of the switch 83 and cycling of the coil 80.

The above cycling of the circuit is repeated sequentially until the wiper contact 77 is advanced from contact 76, number 6, to contact number 7 of the unit R, which contact is open or dead.

The unit R includes a normally open reset switching means R' which means is shown as including a secondary wiper contact 77' and a secondary contact 76', number 7. The switching means R' closes when the wiper arm 77 is advanced to contact 76, number 7.

The unit R has a reset coil 80' with one end connected with line 82 by a leg 82''. The wiper contact 77' is connected with line 81 by a leg 81'.

With the above, when the switch means R' is closed, coil 80° is energized and the unit R is reset, that is, the wiper contact 77 is moved back to contact 76, number 1.

The switch R', and more particularly contact 76' thereof, is connected with the relay switch 74 by a line 84 and so that when the unit R has been fully sequentially operated or advanced and the switching means R' closes to reset the unit R, the relay switch 74 is closed and the unit 60 is energized to operate the dispenser V.

In addition to the above, and so that power to the units 72 and 73 is not turned off when the switches 40 are permitted to open, as when a cart is advanced by the means E, I provide power holding means K, which bridges the switches 40 and is under control of the switching means R'.

The means K includes a first, normally open relay switch 90 in a line 71', which bridges the switches 40 in the line 71. The relay 90 is connected with and under control of the power supply unit 72 by a line 91''. When the power supply unit 72 is energized, the relay switch 90 closes.

The means K next includes a normally closed time delay relay switch 92 in the line 71' and connected with the line 82 by a leg 93 of the line 82.

With the means K, it will be apparent that when the switches 40 close, the relay switch 90 is closed and remains closed until the unit R is fully cycled and the switching means R' is closed, whereupon the switch 92 is opened, thereby shutting off the supply of current to the unit 72, with resulting shutting off of current to the normally open relay switch 90 and normally closed relay switch 92.

With the forging circuit, it will be apparent that the means A that I provide operates to actuate the dispenser V once, each time a cart C is advanced therethrough and that the invention is such that it will only operate as set forth above by the advancing of a cart C through the means A, from the front to the rear end thereof.

It is to be noted that movement of a cart forwardly in the means A will not operate the construction and that removal of a cart from the forward end of the means A, except by physically lifting it out of and from the construction is made impossible, or if not impossible, so difficult as to be unrewarding and not worth pursuing.

In the event the sensing means employed are simple switches such as shown at M' in FIG. 9 of the drawings, a more simple and less costly circuit than is shown and described above can be provided.

Referring to FIG. 13 of the drawings, in the event the sensing means employed are photo electric units such as shown in FIG. 10 of the drawings, the same basic circuit described in the foregoing and shown in FIG. 12 of the drawings, can be employed. In such a case, the photo electric cells M'' would replace the units M and would be connected with the terminal 75 of unit 73 and with the contacts 76 of the unit R.

In addition, the light generating means 55 could be connected with the line 81 from the power supply unit 72 or could, as indicated in FIG. 13 of the drawings, be connected with the lines 70 and 71, as desired or as circumstances require.

It is believed to be apparent and it is to be understood that in practice, the circuit employed in carrying out this invention can be varied widely in details and form and that the circuit illustrated in FIG. 12 and described above is intended to show one suitable and/or typical carrying out of the invention.

The invention here involved next includes cart retaining means Q extending rearwardly from the means A. The means Q comprises a pair of elongate, laterally spaced, parallel fences 100 with front ends joined with the rear ends of the side walls 15 of the housing H and between which carts advanced through the means A are retained and guided. The fences 100 terminate at the rear end 11 of the construction and establish an outlet opening through which the carts can be withdrawn from engagement in the construction. The outlet opening is normally closed by a gate 101 hingedly fixed to one fence 100 as at 102 and releasably latched to the other fence as at 103. The latch means at 103 is preferably a key locked latch means so that unauthorized persons cannot remove carts for the purpose of stealing them or for the purpose of recycling them through the construction and thereby improperly obtain the rewards or gifts dispensed thereby.

In the case illustrated, the fences 100 include flat longitudinally extending base plates 105 bolted or otherwise fixed to the surface S, longitudinally spaced vertical columns 106, established of large diametric tubing or pipe, fixed to and projecting upwardly from the plates, longitudinally extending, horizontal, tubular top rails 107 extending between and joined with the walls 15 of the housing H and the upper ends of the columns 106 and flat, vertical, longitudinally extending lower guide plates 108 fixed to the inwardly disposed sides of the columns on a horizontal plane common with the plane of the lower portions 20 of the frames F of the carts and adapted to be engaged by the cart frames, to guide the carts rearwardly in the construction.

The gate 101 is similar and compatible in construction with the construction of the fences.

In those cases where the rear open end of the construction is within a related store building, the gate 101 need not be provided.

From the foregoing, it will be apparent that I have invented a novel shopping cart receiver which effectively and efficiently receives a plurality of shopping carts and is such that it induces persons to deposit such cart therein by dispensing a reward or gift to the depositor. Further, the receiver is such that it is substantially tamper-proof and is such that it cannot be improperly cycled in such a manner as to effect improper dispensing of the gifts or rewards offered.

Having described my invention, I do not wish to be limited to the specific details herein set forth, but wish to reserve to myself any modifications or variations which may appear to those skilled in the art and which fall within the scope of the following claims.

Having described my invention I claim:

1. A shopping cart receiver of the character referred to comprising an elongate, cart-receiving chute with open front and rear ends, a cart-supporting bottom and laterally spaced, vertical sides between which a plurality of metal shopping carts with pairs of narrow gauge front wheels, wide gauge rear wheels and forwardly convergent tapered frames and baskets are deposited and releasably retained, said receiver having an elongate forwardly extending receiving means at the forward end of the chute into and through which each cart is rollably entered and advanced rearwardly into the receiver, said receiving means including a reward dispenser and having sensing and operating means to sense the engagement and rearward movement of a cart through the receiving means and to operate the dispenser each time the engagement and rearward movement of a cart into and through the receiving means is sensed, stop means carried by the receiving means and engageable with carts to allow rearward movement and to stop forward movement of carts through said receiving means, a retaining gate pivotally mounted at and normally closing the rear end of the chute and releasable latch means normally securing the gate in its normal closed position.

2. A shopping cart receiver as set forth in claim 1 wherein said stop means includes pivoted members at opposite sides of the receiving means normally projecting laterally inwardly from said opposite sides and into the space through which carts deposited in the receiver are directed and moved, said members being movably laterally outwardly when engaged by a cart moved rearwardly into the said space and being laterally immovable when engaged by a cart moved forwardly in said space.

3. A shopping cart receiver as set forth within claim 1 wherein the receiving means includes guide means to orient and direct a cart moved rearwardly relative to and into engagement with the receiving means, said guide means including a pair of laterally spaced, vertical side walls with substantially flat laterally inwardly disposed, opposing guide surfaces engageable with opposite sides of a cart.

4. A shopping cart receiver as set forth in claim 1 wherein said receiving means includes a substantially horizontal bottom surface between the lower edges of a pair of laterally spaced opposing vertical side walls and elongate, laterally spaced, longitudinally extending guide rails projecting upwardly from the bottom surface, said guide rails having laterally inwardly disposed sides to oppose and engage the outer sides of the front wheels of a cart and laterally outwardly disposed sides to oppose and engage the inner sides of the rear wheels of a cart.

5. A shopping cart receiver as set forth in claim 1 wherein the receiving means includes a pair of elongate, horizontal, laterally spaced, normally laterally inwardly and rearwardly convergent guide members with forward ends pivoted to elongate, fixed, laterally spaced vertical side walls of the receiving means and spring means yieldingly resisting lateral outward shifting of the rear ends of the members, said members being arranged within openings at the forward ends of the side walls to be slidably engaged and yieldingly urged laterally outwardly by a cart moved rearwardly between the side walls.

6. A shopping cart receiver as set forth in claim 5 wherein said receiving means further includes a substantially horizontal bottom surface between the lower edges of the side walls and elongate, laterally spaced, longitudinally extending guide rails projecting upwardly from the bottom surface, said guide rails having laterally inwardly disposed sides to oppose and engage the outer sides of the front wheels of a cart and laterally outwardly disposed sides to oppose and engage the inner sides of the rear wheels of a cart.

7. A shopping cart receiver as set forth in claim 1 wherein the sensing and operating means includes a plurality of metal detector devices arranged in spaced relationship in the receiving means, each operable to detect a predetermined proximate positioning of a part of a cart relative thereto and to emit a predetermined electric signal when said part of the cart is in said proximate position, and an electric control circuit receiving the predetermined electric signals from the devices and operable to actuate the dispenser when the signals from all of said devices are received thereby.

8. A shopping cart receiver as set forth in claim 1 wherein the sensing and operating means includes a plurality of electric switches in predetermined spaced relationship in the receiving means and each having movable operating parts related thereto and engageable with a predetermined related portion of a cart when a cart is in predetermined longitudinal position in the receiving means, said switches being connected in an electric control circuit, said circuit operable to actuate the dispenser when the plurality of switches have been sequentially operated in predetermined order by a cart engaged in and moved rearwardly through the receiving means.

9. A shopping cart receiver as set forth in claim 1 wherein the sensing and operating means includes a plurality of light emitters in spaced relationship in the receiving means, and a light sensor related to each emitter in spaced relationship therewith, said emitters and sensors being spaced whereby light passing from the emitters to the sensors is interupted by movement of a cart through the receiving means and predetermined electric signals are sequentially transmitted by the sensors and a control circuit related to the sensors and the dispenser.

* * * * *